United States Patent [19]
Swanstrom, Jr. et al.

[11] Patent Number: 6,059,094
[45] Date of Patent: May 9, 2000

[54] SLIDE GATE FOR AN EN-MASSE CONVEYOR SYSTEM

[75] Inventors: Roger D. Swanstrom, Jr., Buffalo; Richard C. Swanstrom, South Haven; Palmer A. Sorensen, Chanhassen; Richard J. Williams, Elk River; Douglas D. Rathje, Annandale; Randy D. Maurer, Buffalo; Johnny K. Marschel, Annandale, all of Minn.

[73] Assignee: R.R. Howell Company, Annandale, Minn.

[21] Appl. No.: 08/976,301

[22] Filed: Nov. 21, 1997

[51] Int. Cl.[7] .................................................. B65G 15/18
[52] U.S. Cl. ....................................... 198/735.4; 198/359
[58] Field of Search .................................... 198/728, 725, 198/734, 735.4, 359, 360

[56] References Cited

U.S. PATENT DOCUMENTS

| | | | |
|---|---|---|---|
| 3,774,751 | 11/1973 | Bakker | 198/735.4 |
| 3,828,919 | 8/1974 | Holtsclaw et al. | 198/359 |
| 4,023,673 | 5/1977 | Hansen | 198/359 X |
| 4,058,199 | 11/1977 | Schlagel | 198/735.4 X |
| 4,199,054 | 4/1980 | Wirsbinski | 198/735.4 |

OTHER PUBLICATIONS

Flu–Flo Drag Conveyors, catalog, R. R. Howell Co., 501 Malcolm Ave. S.E. Minneapolis, MN 55414, Dated before Nov. 21, 1997.

Primary Examiner—Joseph E. Valenza
Assistant Examiner—Gene O. Crawford
Attorney, Agent, or Firm—Merchant & Gould P.C.

[57] ABSTRACT

The present invention relates generally to a slide gate for use with an en-masse drag conveyor. The slide gate includes a frame adapted to be connected to the conveyor at a location adjacent to a discharge opening of the conveyor. The slide gate also includes a slide panel moveable between a closed position in which the panel is adapted to close the discharge opening, and an open position in which the panel is adapted to be retracted from the discharge opening. The slide gate further includes a moveable support structure adapted for supporting a chain of the conveyor. When the slide panel is moved to the open position, the support structure moves to a first position in which the support structure is adapted for supporting the chain as it traverses the discharge opening. When the panel is moved to the closed position, the support structure moves to a second position in which the support structure is located below the slide panel.

17 Claims, 7 Drawing Sheets

SLIDE GATE FOR AN EN-MASSE CONVEYOR SYSTEM

FIELD OF THE INVENTION

The present invention relates generally to en-masse conveyor systems. More specifically, the present invention relates to en-masse conveyors having intermediate discharge locations controlled by slide gates.

BACKGROUND OF THE INVENTION

En-masse type drag conveyors are commonly used to convey particulate materials. Most drag conveyors include a continuous chain having a plurality of flights that project outward from the chain. In use, the chain is propelled along the bed of a trough. As the chain moves along the trough, particulate material piled on top of the chain is conveyed or carried along the trough. It is significant that particulate material at the top of the pile is moved in unison with particulate material at the bottom of the pile. Consequently, en-masse type drag conveyors produce little agitation that causes damage to the conveyed particulate matter. Other advantages associated with en-masse type drag conveyors include: low dust levels, low maintenance costs, large capacities and flexible intermediate discharge locations.

A common use for en-masse type drag conveyors is in the grain industry for handling feed and grain. Often, en-masse conveyors work in concert with grain elevators to distribute grain and feed to storage silos. For example, grain elevators are commonly used to move feed and grain vertically from ground level to an elevation above the tops of the storage silos. The silos are typically arranged in rows. En-masse conveyors are used to convey the feed and grain horizontally or at a slight incline/decline from the elevator to the silos. The en-masse conveyors are typically equipped with discharge openings located above the silos. The discharge openings are opened and closed by slide gates. By opening a particular slide gate, feed or grain can be discharged into a selected silo. When the selected silo becomes full, the slide gate is closed such that feed and grain is conveyed past the full silo to the next silo in the row.

Some slide gates are constructed with slide panels or doors that are configured to be flush with the bed of an en-masse conveyor trough. Such a flush configuration is advantageous because it helps reduce drag on the conveyor and limits agitation on the grain or feed. Additionally, a flush configuration eliminates vacant areas in which feed or grain could accumulate and possibly lead to contamination of stored feed or grain.

Several operational problems exist with respect to slide gates having the above described flush configuration. For example, when a slide gate having a flush configuration is opened, the en-mass conveying chain is unsupported as it traverses the discharge opening. As a result, the conveying chain sags within the discharge opening. Such sagging is disadvantageous because the flights of the conveying chain often engage or strike the trough at the downstream end of the discharge opening causing damage to both the chain and trough bed. Additionally, the sagging chain can interfere with the operation of the slide gate, causing the slide gate to jam. Jammed slide gates frequently cause the motors that power the slide gates to burn out.

There currently is a need for a slide gate that addresses the above described problems. There is also a need for a slide gate that is durable and capable of withstanding the harsh environmental conditions typically associated with the handling of particulate material such as grain and feed products. The present invention addresses these needs as well as other needs.

SUMMARY OF THE INVENTION

One aspect of the present invention relates to a slide gate for use with an en-masse drag conveyor. The drag conveyor includes a trough that has a bed which defines a discharge opening. The conveyor also includes a chain which extends along the bed and traverses the discharge opening. The slide gate includes a frame adapted to be connected to the conveyor trough at a location adjacent to the discharge opening. The slide gate also includes a slide panel mounted on the frame. The slide panel is moveable between a closed position in which the panel is adapted to close the discharge opening, and an open position in which the panel is adapted to be retracted from the discharge opening. The slide gate also includes a moveable support structure adapted for supporting the chair of the conveyor. When the panel moves to the open position, the support structure moves to a first position in which the support structure is adapted to support the chain as it traverses the discharge opening. By contrast, when the panel moves to the closed position, the support structure moves to a second position in which the support structure is located below the slide panel.

Another aspect of the present invention relates to a slide gate for use with an en-masse drag conveyor. The slide gate includes a frame adapted to be connected to the conveyor at a location adjacent to a discharge opening of the conveyor. The slide gate also includes a slide panel mounted on the frame and adapted to open and close the discharge opening of the conveyor. The slide gate further includes first and second support members that are pivotally mounted relative to the frame. The support members are pivotally moveable between a first position in which the support members are adapted for supporting the chain of the conveyor as the chain traverses the discharge opening, and a second position in which the support members are located below the slide panel.

A further aspect of the present invention relates to a system for conveying particulate material. The system includes an en-masse drag conveyor having a trough with a bed that defines a discharge opening. The conveyor also includes a chain that extends along the bed of the trough and that traverses the discharge opening. The system also includes a slide gate connected to the conveyor below the discharge opening. The slide gate includes a slide panel arranged and configured for opening and closing the discharge opening. The slide gate also includes a moveable support structure moveable between a first position in which the support structure supports the chains as the chain traverses the discharge opening, and a second position in which the support structure does not interfere with the slide panel.

As is apparent from the above described aspects of the present invention, the present invention provides a slide gate configuration having a moveable support structure for selectively supporting a conveyor chain as it traverses a discharge opening. The moveable nature of the support structure allows the support structure to support the conveyor chain without interfering with the movement of the slide gate slide panel. Consequently, the support structure prevents sagging of the conveyor chain while allowing the slide panel to have a flush configuration with respect to the bed of the en-masse conveyor trough. The various aspects of the present invention also include various features and design characteristics that help to improve the durability and ease of operation of the support structure.

A variety of additional advantages of the invention will be set forth in part in the description which follows, and in part will be apparent from the description, or may be learned by practicing the invention. The advantages of the invention will be realized and attained by means of the elements and combinations particularly pointed out in the claims. It is to be understood that the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate various aspects of the invention and together with the description, serve to explain the principles of the invention. A brief description of the drawings is as follows.

DETAILED DESCRIPTION OF THE DRAWINGS

Reference will now be made in detail to an exemplary embodiment of the present invention which is illustrated in the accompanying drawings. Where ever possible, the same reference numbers will be used throughout the drawings to refer to the same or like parts.

Figure 1:
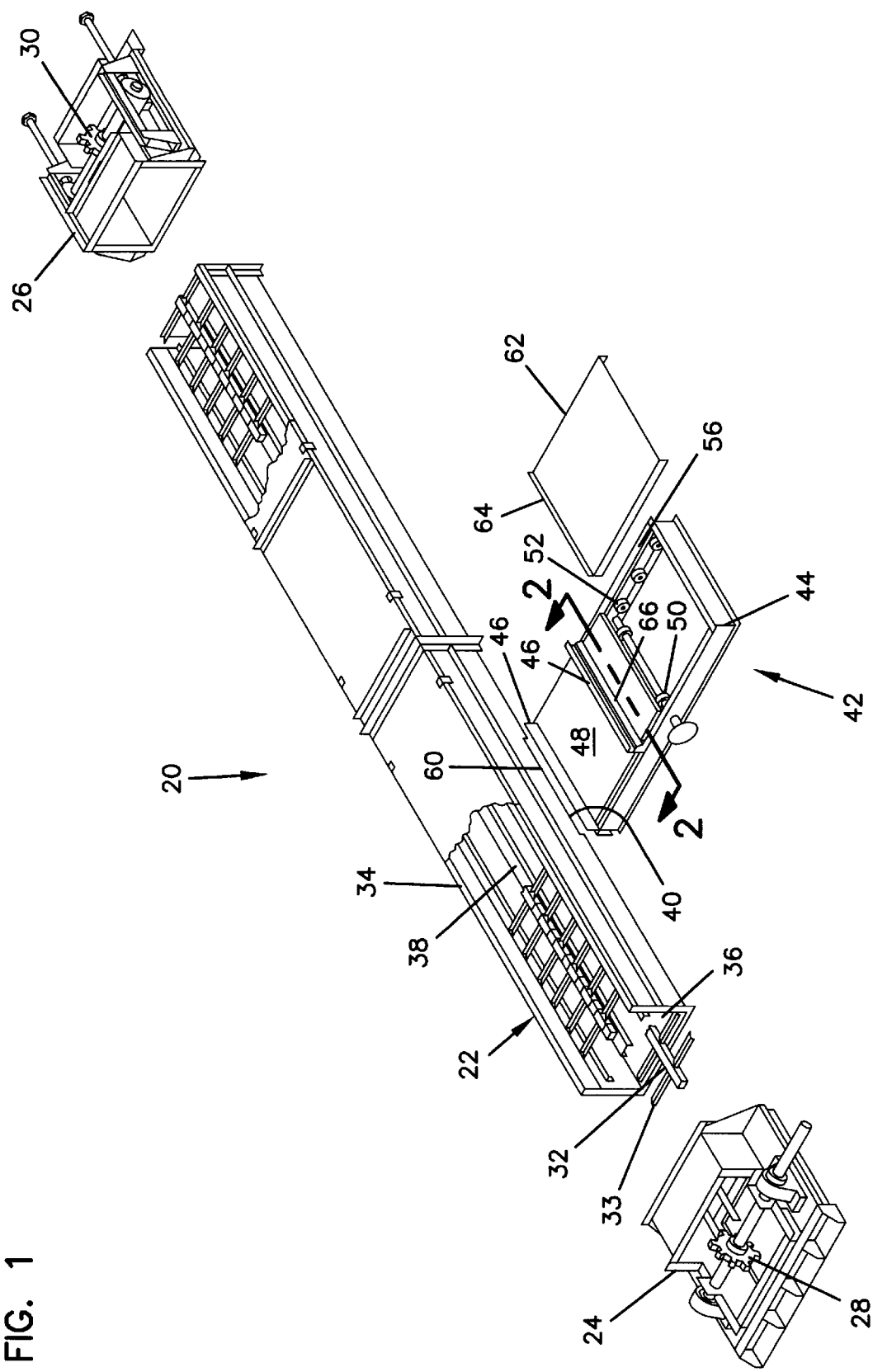
FIG. 1 is a partially cut-away and partially exploded perspective view of an en-masse conveyor system constructed in accordance with the principles of the present invention.

FIG. 1 illustrates a conveying system 20 for conveying particulate material such as feed, grain, coal, or aggregate. The conveying system 20 includes a drag conveyor 22 having a head section 24 positioned opposite from a tail section 26. The head section 24 includes a drive sprocket 28 that is driven by a motor (not shown). The tail section 26 includes an idler sprocket 30. A continuous chain 32 having a plurality of flights 33 extends between and is mounted on the drive and idler sprockets 28 and 30. Also positioned between the head and tail sections 24 and 26 is trough section 34. The trough section 34 has a generally U-shaped cross section and in certain embodiments includes an ultra high molecular weight (UHMW) liner. The trough section 34 also includes a bed 36 for supporting the chain 32 as it moves particulate material from the head section 24 to the tail section 26 and a slide rail return 38 for supporting the chain 32 as it moves from the tail section 26 back towards the head section 24. The bed 36 defines one or more discharge openings 40 for discharging particulate material from the conveyor 22.

Figure 4:
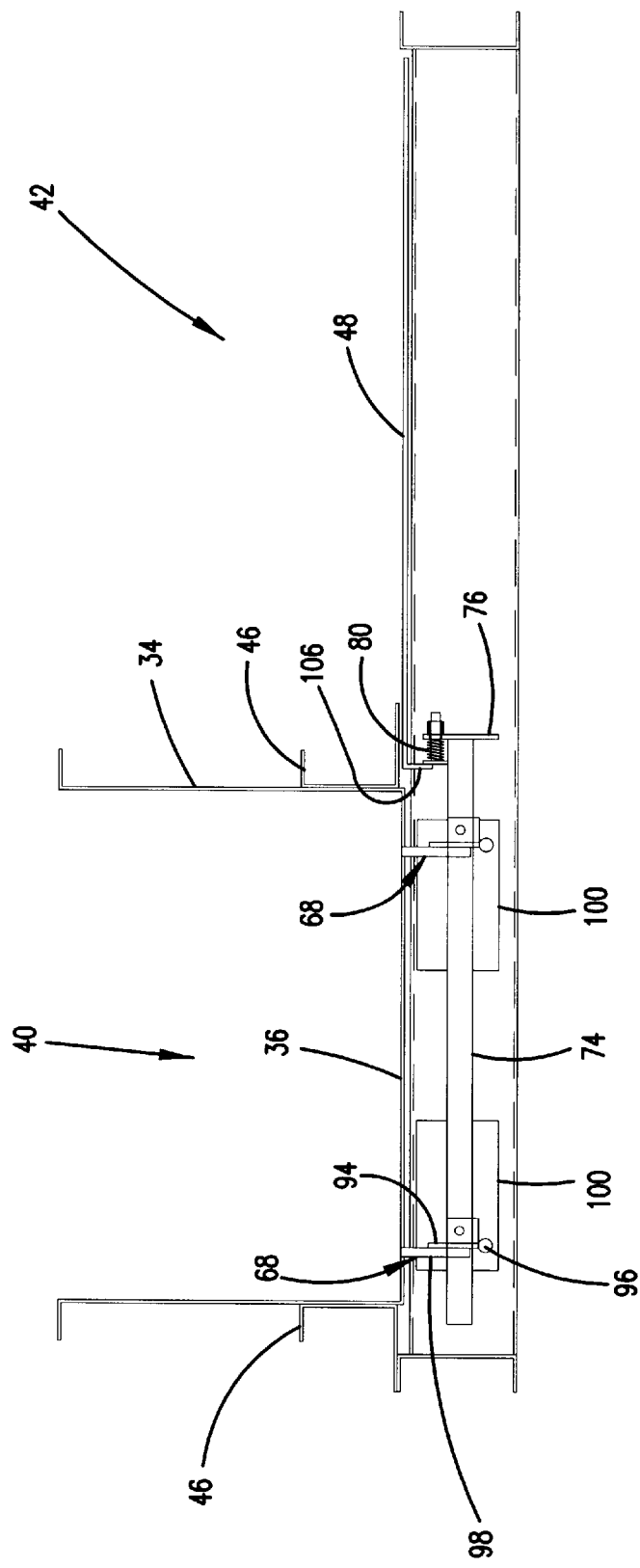
FIG. 4 is a front view of the slide gate of FIG. 3 illustrating a support structure in a raised position.
Figure 5:
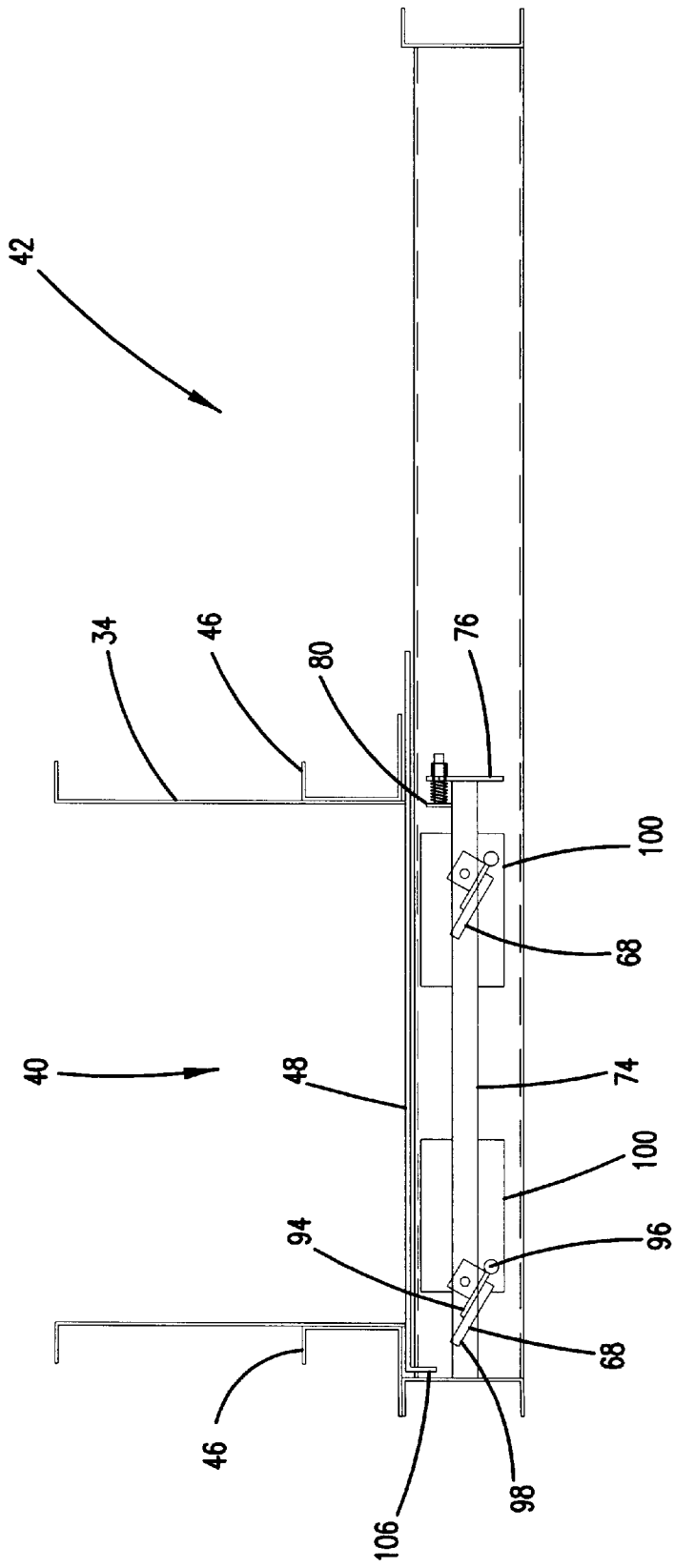
FIG. 5 is a front view of the slide gate of FIG. 3 illustrating a support structure in a retracted position.

The conveying system 20 also includes a slide gate 42 for opening and closing the discharge opening 40 of the conveyor 22. The slide gate 42 includes a frame 44 that can be connected to the bottom of the trough section 34 at a location adjacent to the discharge opening 40. The frame 44 includes a pair of connecting flanges 46 that can be connected to opposite sides of the trough section 34 such that a portion of the slide gate 42 is located directly below the discharge opening 40. The slide gate 42 also includes a slide panel 48 that can be moved relative to the frame 44 to open and close the discharge opening 40. FIGS. 1 and 5 show the slide panel 48 in a closed position in which the slide panel 48 is adapted to close the discharge opening 40. By contrast, FIG. 4 shows the slide panel 48 in an open position in which the slide panel is adapted to close the discharge opening 40.

Figure 2:
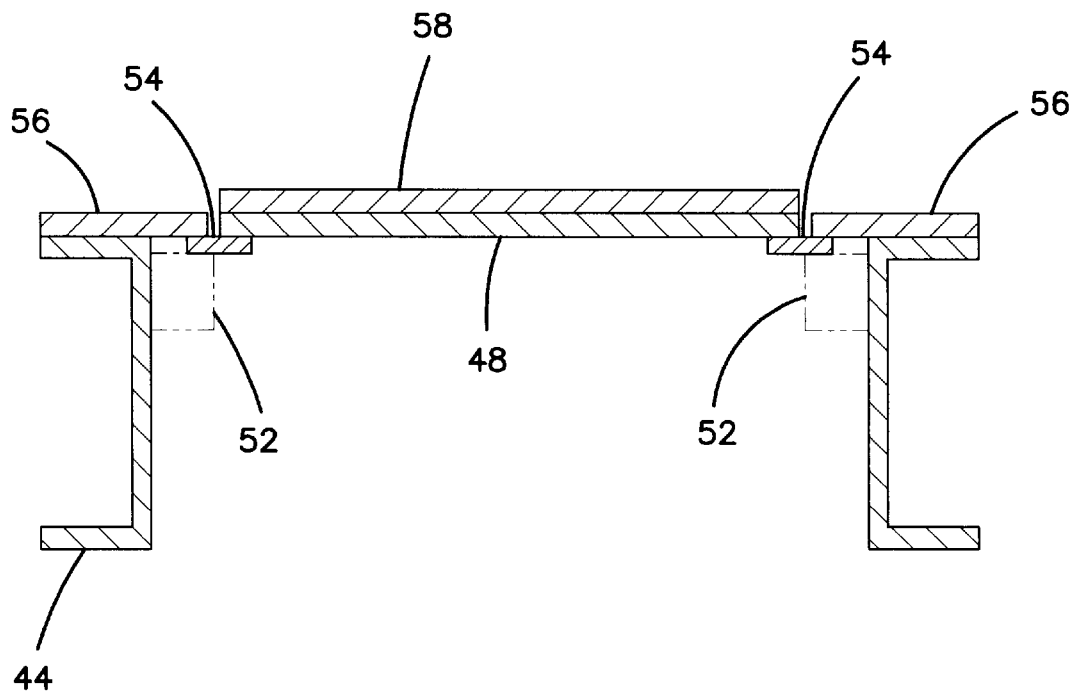
FIG. 2 is a cross sectional view taken along section line 2—2 of FIG. 1.

A rack and pinion mechanism 50, which can either be mechanically or manually operated, in used to drive the slide panel 48 between the open and closed positions. The slide panel 48 is supported within the frame 44 by a plurality of rollers 52 which facilitate sliding the slide panel 48 and help to prevent the slide panel 48 from freezing in a particular position. As shown in FIG. 2, the slide panel 48 includes edge portions 54 that are captured between the rollers 52 and upper lips 56 of the frame 44. The rollers 52 and upper lips 56 cooperate to retain the slide panel 48 within the frame 44 while concurrently allowing the slide panel 48 to slide relative to the frame 44. As shown in FIG. 2, the slide panel 48 includes an upper liner layer 58 of UHMW material or of steel. Such a liner layer 58 would typically correspond with a similar liner layer along the bed 36 of the trough section 34. Of course, certain embodiments of the present invention may not be equipped with UHMW liners.

Referring back to FIG. 1, the trough section 34 includes a cutaway portion or slot 60 located adjacent to the discharge opening 40. The slot 60 is arranged and configured to provide clearance for the slide panel 48 when the slide panel is moved to the closed position. The configuration of the slot 60 allows the slide panel 48 to be substantially flush with the bed 36 of the trough section 34.

The slide gate 42 is also equipped with a top cover 62 for covering the portion of the slide gate 42 that is not mounted below the trough section 34. The top cover 62 has a lip 64 configured to fit beneath a flange 66 of the frame 44 to prevent water from entering the slide gate 42. Basically, the lip 64 and flange 66 operate similar to flashing to prevent leakage into the slide gate 42.

Figure 3:
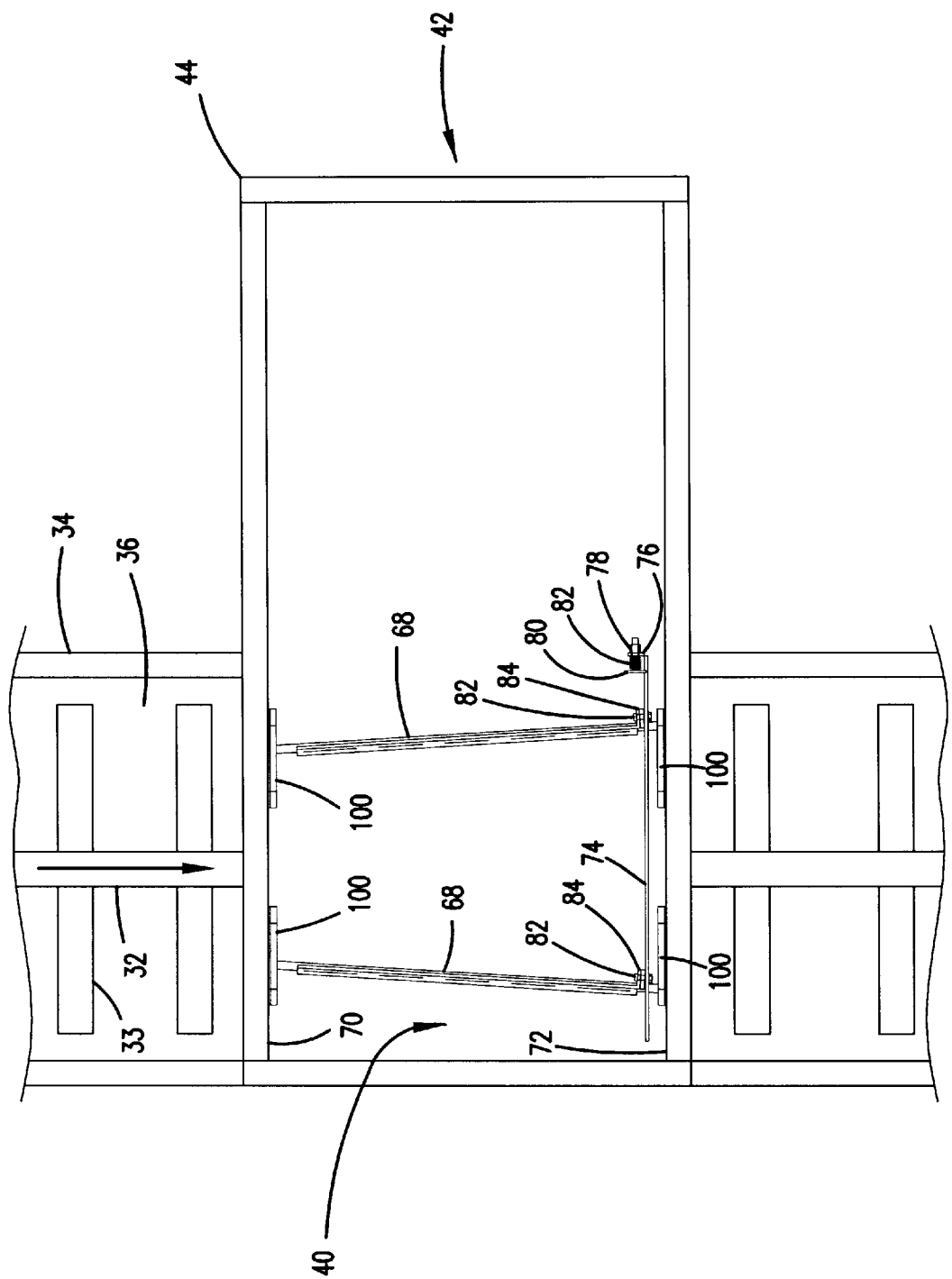
FIG. 3 is a top view of a slide gate constructed in accordance with the principles of the invention.

FIGS. 3–5 provide additional views of the slide gate 42. In FIGS. 3–5, portions of the slide gate 42 have been removed to more clearly show certain moveable internal support structure configured for supporting the continuous chain 32 as it traverses the discharge opening 40. As shown in FIGS. 3–5, the moveable support structure includes a pair of support members 68 that are pivotally moveable relative to the frame 44. The support members 68 are arranged and configured to extend between an upstream end 70 and a downstream end 72 of the discharge opening 40. The support members 68 are pivotally moveable between a raised position (shown in FIG. 4) and a lowered position (shown in FIG. 5). In the raised position, the support members 68 are arranged and configured to support the flights 33 of the continuous chain 32 as the continuous chain 32 traverses the discharge opening 40. In the lowered position, the support members 68 are positioned completely below the slide panel 48 and are arranged and configured to not interfere with the movement of the slide panel 48.

When the support members 68 are in the upper position (as shown in FIG. 4), it is preferred for the tops of the support members 68 to be substantially flush with a top surface of the bed 36 of the trough section 34. The phrase substantially flush is intended to mean that the tops of the support members 68 are substantially coplanar with the top surface of the bed 36. Additionally, the phrase substantially flush is intended to also include situations in which the tops of the support members 68 may be slightly above or slightly below the top surface of the bed 36. What is significant is when the support members 68 are in the raised position of FIG. 4, the support members are configured to smoothly guide the chain 32 across the discharge opening 40 without allowing the significant sagging of the chain 32.

It is also preferred for the slide panel 48 to have a top surface adapted to be substantially flush with the top surface of the bed 36 of the trough section 34. Once again, the phrase substantially flush is intended to mean that the top surface of the slide panel 48 is adapted to be substantially coplanar with the top surface of the bed 36 of the trough section 34. Of course, the top surface of the slide panel 48 and the top surface of the bed 36 need not be exactly coplanar. Instead, in certain circumstances, the slide panel 48 may be slightly raised or slightly recessed with respect to the top surface of the bed 36. The phrase substantially flush is intended to also include such situations.

Referring back to FIG. 3, the support members 68 are spaced apart so as to be configured for supporting the flights 33 of the chain 32. Also, the support members 68 are angled or tapered relative to one another such that a larger gap between the support members 68 exists adjacent the downstream end 72 of the discharge opening as compared to the upstream end 70 of the discharge opening 40. The tapered configuration helps to prevent particulate matter from being pushed across the discharge opening 40 on the support members 68. Additionally, the wider spacing adjacent the downstream end 72 of the discharge opening 40 helps to provide more stable support for the chain 32.

Figure 6:
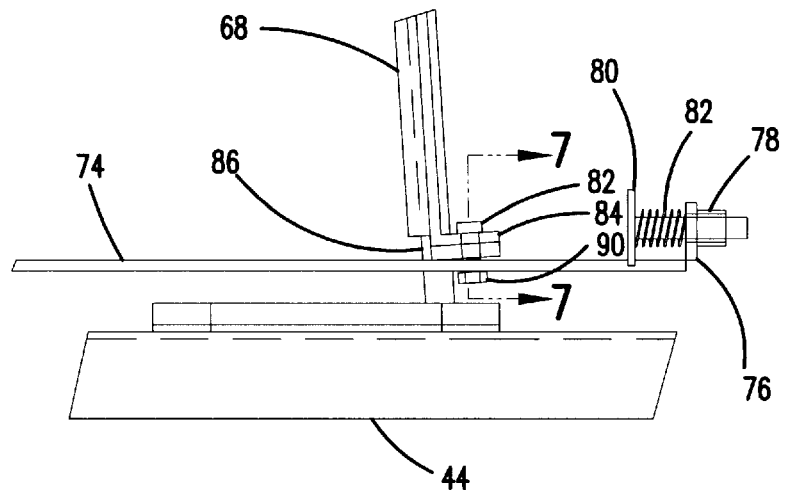
FIG. 6 is a detailed view of a portion of FIG. 3.

The support members 68 are pivotally interconnected by a linkage member 74 located at the downstream end 72 of the discharge opening 40. Referring to FIGS. 3 and 6, the linkage member 74 includes a lateral offset member 76 that projects transversely outward from one end of the linkage member 74. The lateral offset member 76 includes a mounting sleeve 78 defining an opening in which a plunger 80 is mounted. A spring 83 is positioned between the head of the plunger 80 and the lateral offset member 76. A cotter pin is used to prevent the plunger 80 from disengaging from the mounting sleeve 78.

Figure 7:
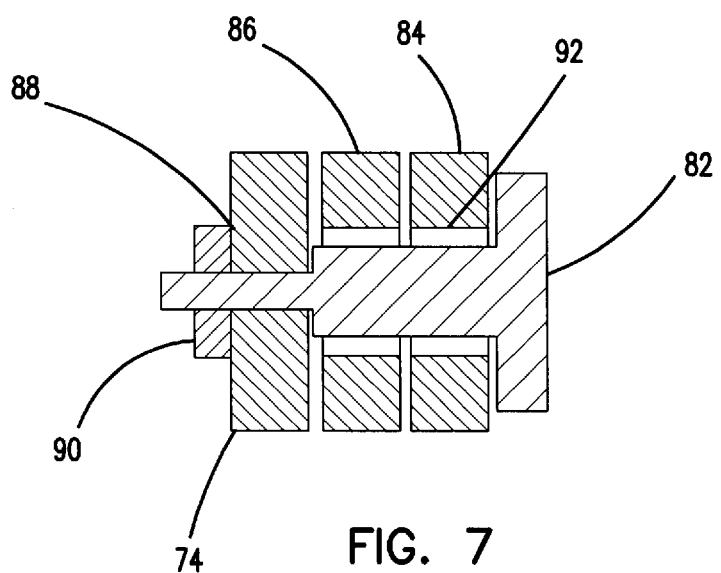
FIG. 7 is a cross sectional view taken along section line 7—7 of FIG. 6.
Figure 8:
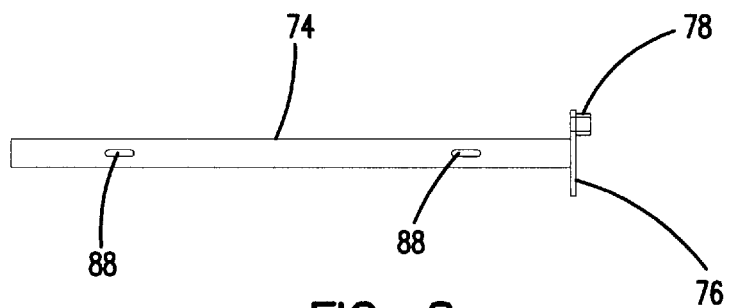
FIG. 8 is a front view of a linkage utilized by the slide gate of FIG. 3.

As shown in FIGS. 3, 6 and 7, the linkage member 74 is pivotally connected to the support members 68 by shoulder bolts 82. The shoulder bolts 82 extend through elongated openings 88 (shown in FIG. 8) defined by the linkage member 74 and are tightened against the linkage member 74 by nuts 90. The shoulder bolts 82 also extend through apertures 92 defined within lateral projections 84 that extend transversely outward from the support members 68. The apertures 92 are sufficiently large that a loose fit exists between the shoulder bolts 82 and the lateral projections 84. The loose fit helps to prevent binding between the support members 68 and the linkage member 74 as the support members 68 are pivoted relative to the frame 44. Binding is also prevented by spacers 86 positioned between the lateral projections 84 and the linkage member 74.

Figure 10:
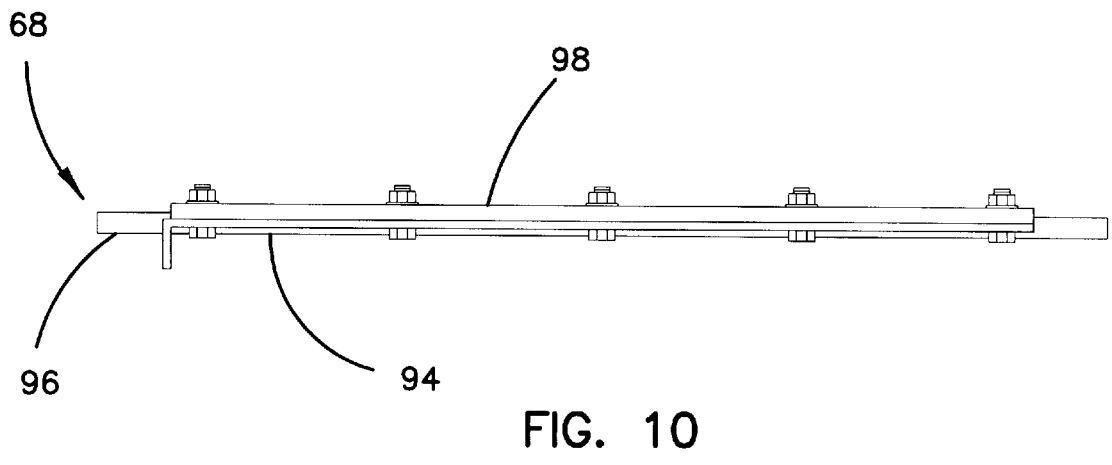
FIG. 10 is a top view of a support member utilized by the slide gate of FIG. 3.
Figure 11:
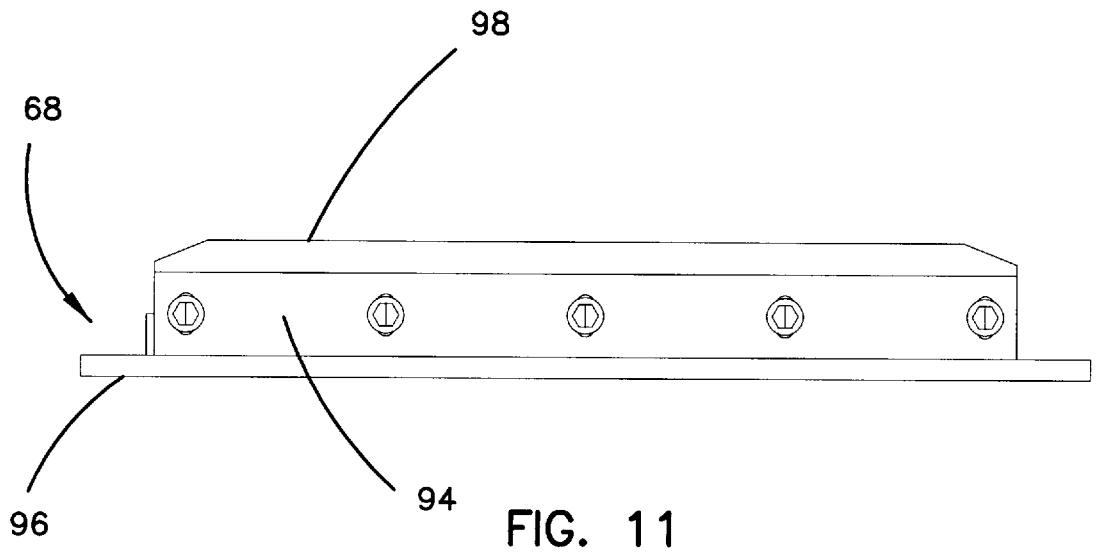
FIG. 11 is a front view of the support member of FIG. 10.

Referring to FIGS. 10 and 11, the support members 68 include mounting plates 94 that are welded to shafts 96. Support plates 98 are bolted to the mounting plates 94. Preferably, bolt holes defined by either or both of the plates 94 and 98 are vertically elongated such that the support plates 98 can be vertically adjusted with respect to the mounting plates 94. In certain embodiments, the support plates 98 can be made of UHMW material. For example, if the chain flights 33 are made of steel, it is preferred for the support plates to be made of UHMW material to reduce wear.

Figure 9:
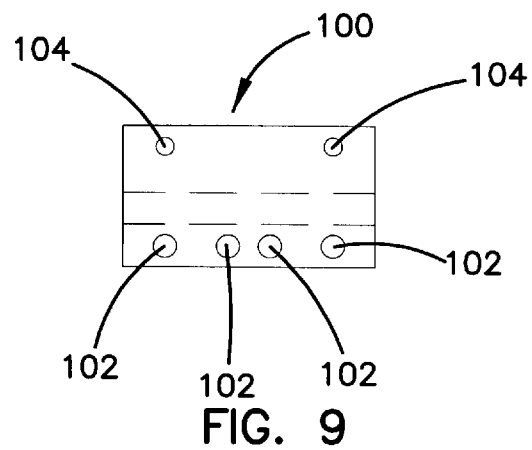
FIG. 9 is a front view of a connecting plate utilized by the slide gate of a FIG. 3.

The shafts 96 have ends that are journaled within connecting plates 100 that are connected to the frame 44 adjacent to the upstream and downstream ends 70 and 72 of the discharge opening 40. As shown in FIG. 9, the connecting plates 100 include a plurality of openings 102 for receiving the ends of the support member shafts 96. The multiple openings 92 defined by the connecting plates 100 allow the spacing of the support members 68 to be varied. The connecting plates 100 also include openings 104 for bolting the connecting plates 100 to the frame 44. In certain embodiments, the connecting plates 100 can be bolted to the frame 44 by shoulder bolts, and rollers for guiding the slide panel 48 can be rotatably mounted on the shoulder bolts.

In operation, the slide gate 42 is used to selectively open and close the discharge opening 40 of the drag conveyor 22. To open the discharge opening 40, the slide panel 48 of the slide gate 42 is moved from the closed position (shown in FIG. 5) to the open position (shown in FIG. 4). As the slide panel 48 moves from the closed position toward the open position, a downwardly bent portion 106 of the slide panel 48 engages the plunger 80 of the linkage member 74 causing the support members 68 to be pivoted from the lowered position to the raised position. In the raised position, the support members 68 are configured for supporting the continuous chain 32 as it traverses the open discharge opening 40. When it is desired to close the discharge opening 40, the slide panel 48 is moved from the open position (shown in FIG. 4) to the closed position (shown in FIG. 5). As the slide panel 48 moves from the open position to the closed position, the downwardly bent portion 106 of the slide panel 48 physically pushes the support members 68 from the raised position to the lowered position. When the support members 68 are in the lowered position, the support members 68 do not interfere with the panel 48.

As shown in FIGS. 4 and 5, the slide panel 48 is moveable relative to the frame 44 along a planar path of travel. When the support members 68 are in the raised position, at least portions of the support member 68 intersect with the path of travel of the slide panel 48. By contrast, when the support members 68 are lowered, the support members 68 are positioned below the slide panel 48 and do not intersect with the path of travel of the slide panel 48.

With regard to the foregoing description, it is to be understood that changes may be made in detail, especially in matters of the construction materials employed and the shape, size and arrangement of the parts without departing from the scope of the present invention. It is intended that the specification and depicted embodiment be considered exemplary only, with a true scope and spirit of the invention being indicated by the broad meaning of the following claims.

What is claimed is:

1. A slide gate for use with an en-masse drag conveyor, the conveyor including a trough having a bed that defines a discharge opening, the conveyor also including a chain that extends along the bed and traverses the discharge opening, the conveyor further including a plurality of flights that extend transversely outward from opposite sides of the chain for moving the particulate matter along the trough, the slide gate comprising:

a frame adapted to be connected to the conveyor trough at a location adjacent to the discharge opening;

a slide panel mounted on the frame, the slide panel being moveable between a closed position in which the panel is adapted to close the discharge opening, and an open position in which the panel is adapted to be retracted from the discharge opening;

a moveable support structure adapted for supporting the flights of the conveyor, wherein when the panel moves to the open position, the support structure moves to a first position in which the support structure is adapted to support the flights as the chain traverses the discharge opening, and when the panel moves to the closed position, the support structure moves to a second position in which the support structure is located below the slide panel; and the support structure including first and second spaced-apart support members adapted to align on opposite sides of the chain, the first and second support members being arranged and configured for engaging and supporting the flights when the support structure is in the first position.

2. The slide gate of claim 1, wherein the slide panel physically pushes the moveable support structure to the second position as the slide panel is moved to the closed position, and the slide panel physically pulls the moveable support structure to the first position as the slide panel is moved to the open position.

3. The slide gate of claim 1, wherein when the slide panel is in the closed position, the slide panel is substantially flush with the bed of the trough.

4. The slide gate of claim 1, wherein when the moveable support structure is in the first position, at least portions of the support structure are flush with a top surface of the slide panel.

5. The slide gate of claim 1, wherein the first and second support members are pivotally connected to the frame.

6. The slide gate of claim 5, wherein first and second support members taper toward one another.

7. The slide gate of claim 6, wherein the support members are arranged to have a wider spacing adjacent a downstream end of the discharge opening than adjacent an upstream end of the discharge opening.

8. The slide gate of claim 5, wherein the first and second support members are pivotally interconnected by a linkage.

9. The slide gate of claim 8, wherein the linkage is configured to be located at a downstream end of the discharge opening.

10. The slide gate of claim 8, wherein the linkage includes a spring loaded plunger.

11. The slide gate of claim 10, wherein the slide panel includes a bent end configured for pushing the support members to the second position as the slide panel is moved to the closed position, and pulling the support members to the first position as the slide panel is moved to the open position, wherein the bent end pulls the support members to the first position by engaging the plunger of the linkage.

12. A slide gate for use with an en-masse drag conveyor, the conveyor including a trough having a bed that defines a discharge opening, the conveyor also including a chain that extends along the bed and traverses the discharge opening, the chain configured for moving the particulate matter along the trough, the slide gate comprising:

a frame adapted to be connected to the conveyor trough at a location adjacent to the discharge opening;

a slide panel mounted on the frame, the slide panel being adapted to open and close the discharge opening of the conveyor;

first and second support members that are moveable between a first position in which the support members are adapted for supporting the chain of the conveyor as the chain traverses the discharge opening, and a second position in which the support members are located below the slide panel;

the slide panel having a top surface that is adapted to be substantially flush with the bed of the conveyor; and the support members including top portions positioned such that when the support members are in the first position, the top portions of the support members and the top surface of the slide panel are aligned substantially within a single common plane.

13. A system for conveying particulate material comprising:

an en-masse drag conveyor, the conveyor including a trough having a bed that defines a discharge opening, the conveyor also including a chain that extends along the bed and traverses the discharge opening, the conveyor further including a plurality of flights that extend outward from opposite sides of the chain for moving the particulate matter along the trough;

a slide gate connected to the conveyor below the discharge opening, the slide gate including a slide panel arranged and configured for opening and closing the discharge opening, the slide gate also including a moveable support structure moveable between a first position in which the support structure supports the flights as the chain traverses the discharge opening, and a second position in which the support structure does not interfere with the slide panel;

the support structure including first and second spaced-apart support members for engaging and supporting the flights as the chain traverses the discharge opening, the first and second support members extending across the discharge opening on opposite sides of the chain when the support structure is in the first position.

14. The system of claim 13, wherein the first and second support members are pivotally moveable with respect to the slide gate.

15. The system of claim 14, wherein the support members are pivoted upward to the first position, and are pivoted downward to the second position.

16. The slide gate of claim 14, wherein the slide panel has a top surface that is substantially flush with the bed of the conveyor when the discharge opening is closed.

17. The slide gate of claim 16, wherein the support members include top portions that are substantially flush with the bed of the trough when the discharge opening is open.

\* \* \* \* \*